(12) United States Patent
Cai

(10) Patent No.: US 11,639,041 B2
(45) Date of Patent: May 2, 2023

(54) PROCESS FOR PRODUCING ANTI-GRAVITY BALANCE MASSAGE TYPE BUFFER CONVECTION AIRBAG AND AIRBAG CUSHION

(71) Applicant: Dongguan Jiashuan Industrial Co., Ltd., Guangdong (CN)

(72) Inventor: Peilin Cai, Guangdong (CN)

(73) Assignee: Dongguan Jiashuan Industrial Co., Ltd., Guangdong (CN)

(*) Notice: Subject to any disclaimer, the term of this patent is extended or adjusted under 35 U.S.C. 154(b) by 366 days.

(21) Appl. No.: 16/809,538

(22) Filed: Mar. 4, 2020

(65) Prior Publication Data

US 2020/0298514 A1  Sep. 24, 2020

(30) Foreign Application Priority Data

Mar. 21, 2019 (CN) .......................... 201910216734.6

(51) Int. Cl.
  *B29D 22/02*  (2006.01)
  *A43B 13/20*  (2006.01)
  *F16F 9/04*  (2006.01)

(52) U.S. Cl.
  CPC ............ *B29D 22/02* (2013.01); *A43B 13/206* (2013.01); *F16F 9/0454* (2013.01); *F16F 2226/04* (2013.01)

(58) Field of Classification Search
  CPC .... B29D 22/02; A43B 13/206; F16F 2226/04; F16F 9/0454; F16F 9/04; F16F 9/0418
  See application file for complete search history.

(56) References Cited

U.S. PATENT DOCUMENTS

| 6,976,321 | B1* | 12/2005 | Lakic | A43B 17/006 |
| | | | | 36/28 |
| 8,851,516 | B2* | 10/2014 | Kwak | B60R 21/231 |
| | | | | 442/76 |
| 9,694,781 | B2* | 7/2017 | Kwak | D05B 13/00 |
| 2019/0291936 | A1* | 9/2019 | Liu | B29C 65/02 |

FOREIGN PATENT DOCUMENTS

| CN | 102922761 A | 2/2013 |
| CN | 104192090 A | 12/2014 |
| CN | 105121142 A | * 12/2015 |
| CN | 108477749 A | 9/2018 |
| CN | 108882779 A | * 11/2018 |

OTHER PUBLICATIONS

Translation of Chinese Patent No. CN 105121142 obtained from website: https://worldwide.espacenet.com on Jun. 28, 2022.*

* cited by examiner

*Primary Examiner* — Pamela Rodriguez
(74) *Attorney, Agent, or Firm* — ScienBiziP, P.C.

(57) ABSTRACT

Disclosed in the present invention are a process for producing an anti-gravity balance massage type buffer convection airbag and an airbag cushion. The production process comprises the steps of preparing materials, laminating, preparing an upper cushion body, preparing a lower cushion body, laminating the upper cushion body and the lower cushion body, and shaping to obtain a finished product. The production process and the airbag cushion can produce anti-gravity and buffer convection effects while increasing the force area, and have the effects of balance and massage.

13 Claims, 17 Drawing Sheets

PROCESS FOR PRODUCING ANTI-GRAVITY BALANCE MASSAGE TYPE BUFFER CONVECTION AIRBAG AND AIRBAG CUSHION

CROSS REFERENCE TO RELATED APPLICATIONS

The present application claims the benefit of Chinese Patent Application No. 201910216734.6 filed on Mar. 21, 2019, the contents of which are incorporated herein by reference in their entirety.

FIELD OF THE INVENTION

The present invention belongs to the field of living appliances, and particularly relates to a process for producing an airbag and an airbag cushion produced thereby.

BACKGROUND OF THE INVENTION

In daily life, bag products such as shoulder strap backpacks, waist bags, shoulder bags, and arm bags are often used for home, automobiles, medical care, sports and the like. Conventional bag products often only focus on the functionality of charging, it is considered more during design or purchase about how many pockets a bag has, how many things a bag can be charged or whether the appearance looks good or the like, but the comfort of usage of a bag is seldom considered. During the use of a backpack, the weight is generally concentrated on the shoulders, waist, neck or arms of a human body. However, during use, a user in motion will have a slight vibration, and straps of the backpack will produce impact and friction on the contact parts. The impact and friction may produce quite powerful negative effects, especially when the user is exercising vigorously. When the backpack is charged with many articles or used for a long time, the local blood in these parts will not be able to circulate smoothly due to long-term pressure, which brings pain; and the contact parts are airtight, prone to sweat and unable to dissipate heat effectively, which makes the user feel extremely uncomfortable, affects skin health, and leaves health hazards.

Patent application 201410400100.3 discloses an airbag cushion and an airbag system including the same, and particularly relates to an airbag cushion including: at least one fabric; and seam parts connecting the fabric, wherein deviation of upper seam thread length per a unit length of the fabric between the first seam part sewed in forward direction and the second seam part sewed in reverse direction in the seam parts is 15% or less. The airbag cushion and the airbag system provide optimized performance in the presence of the seam parts, also provide excellent shape stability and airtightness, and can protect a passenger by minimizing the impact applied to the passenger. However, this patent application only seals the airbag, there is no air channel between adjacent airbags, and there is no air exchange between the airbags, so the airbag only has a buffering effect, has a single function, and cannot meet user's multifunctional needs.

Patent application 201210407409.6 discloses a method for manufacturing a shock-absorbing air cushion for shoes and a shock-absorbing air cushion. The manufacturing method includes: first providing an injection mold, injecting a thermoplastic into the injection mold through an injection molding process to form an upper air cushion piece and a lower air cushion piece in two molding spaces of the injection mold after the thermoplastic is cooled, opening the mold, releasing the manufactured upper air cushion piece and lower air cushion piece from the mold, adding an air nozzle to the upper air cushion piece or the lower air cushion piece, bonding the upper air cushion piece with the lower air cushion piece, seaming with the air nozzle together by high-frequency hot melting, then cutting leftover materials, and finally applying different air pressures through the air nozzle. Fewer leftover materials need to be cut after the shock-absorbing air cushion is molded, so materials are saved; and the internal shape and structure of the air cushion are injection-molded from the upper air cushion piece and the lower air cushion piece, after high-frequency hot-melt seaming, the stability is high, the internal structure can be freely changed according to customer requirements, and at the same time, the effect of separating two colors of the upper air cushion piece and the lower air cushion piece can be achieved. This method proposes a method for manufacturing an air cushions with a mold, which can quickly complete the production of air cushions, but the problem is that when the air cushion pieces are made with the mold, a lot of time is required for cooling, otherwise, the air cushion pieces will be adhered to the mold and are difficult to release, thus resulting in a large number of defective products, and seriously affecting the manufacturing efficiency.

Patent application 201810286773.9 discloses a rubber sole with an internal integrated air cushion layer, including a rubber sole sheet, an intermediate rubber sheet, and a rubber surface sheet, wherein the rubber sole sheet and the rubber surface sheet are shaped by a mold and a hot press vulcanization to form an incompletely vulcanized rubber sole layer and a rubber surface layer respectively, the bottom of the rubber surface layer forms a protruding structure portion, the intermediate rubber sheet is arranged between the incompletely vulcanized rubber sole layer and the rubber surface layer, and the incompletely vulcanized rubber shoe layer, the rubber surface layer and the intermediate rubber sheet are then completely vulcanized and integrally molded by one-time hot press melting. This application, which uses rubber sheets to manufacture a rubber sole with an air cushion layer, has certain positive effects. However, the application still faces the above problems, that is, the air cushion is formed with a mold by hot pressing, and the rubber sheets certainly have certain bonding force with the mold, so that the demolding is difficult, the qualification rate of products is difficult to ensure, and the processing efficiency and speed are affected.

SUMMARY OF THE INVENTION

In order to solve the above problems, the present invention provides a process for producing an anti-gravity balance massage type buffer convection airbag and an airbag cushion, wherein the process can effectively and quickly produce airbag cushions, and improve the production efficiency and qualification rate of airbag cushions; and the produced airbag cushion can simultaneously produce anti-gravity and buffer convection effects while increasing the stress area, and has the effects of balance and massage.

Another objective of the present invention is to provide a process for producing an anti-gravity balance massage type buffer convection airbag and an airbag cushion, wherein the airbag cushion is breathable and firm in structure, can buffer an impact force, and can be applied to shoulder strap type shoulder pads, household seat cushions and lumbar cushions, medical mattresses, pillows, automotive safety belts, seat cushions and lumbar cushions, outdoor sports knee pads, wrist pads, shoe pads, motorcycle pads, bicycle pads, etc.

In order to achieve the above objectives, the technical solution of the present invention is as follows:

A process for producing an anti-gravity balance massage type buffer convection airbag, including the following steps:

Step 1: preparing materials for preparing cushion surfaces required for producing the airbag;

Step 2: laminating and molding the cushion surfaces to obtain a material I;

Step 3: preparing an upper cushion body;

First, the material I is heated, then the material I is covered with a material II, and die-casting molding is performed with a mold to obtain the upper cushion body; the material II is an elastic fabric and can thus be stretched and completely cover the material I; by spreading the material II, the material II can be isolated from the die-casting mold, and the material II can be prevented from being adhered to the die-casting mold; and after the die-casting molding, the material II is removed to obtain the upper cushion body. The material II is an isolation article, and mainly functions to isolate the material I from the die-casting mold, to prevent the material I from being adhered to the mold, and also to prevent the material I and the material II from being adhered together, thereby improving the qualification rate of products, also achieving quick demolding, and improving the processing efficiency.

Further, the material II is wet (usually sprayed with water) and then can be able to cover the material I. Water can form a water film at a high temperature to form a small isolation layer between the material I and the material II and between the material II and the mold, which facilitates demolding and releasing.

Step 4: preparing a lower cushion body;

Step 5: laminating the upper cushion body and the lower cushion body;

Step 6: shaping to obtain a finished product.

After the upper cushion body and the lower cushion body are laminated, the semi-finished product needs to be further filled with air or liquid, and the upper cushion body and the lower cushion body are sealed after being filled with air or liquid. There are usually two types of air cushions. One is to fill air or liquid through an air nozzle for inflation, and the other is to achieve an air or liquid filled air cushion. For the first type of airbag cushion with an air nozzle, there is no need to fill air, and the air nozzle is mounted or an air hole is reserved at a specific position. For the airbag cushion that needs to be inflated, an air filling device is used to fill air, and air channels between the airbags that need to be isolated, the air nozzle and the air channels are sealed after air filling.

Further, in step 1, the specific operation is: S1: preparing an upper cushion surface and a lower cushion surface, smearing the upper surface of the lower cushion surface uniformly with a hot-melt adhesive, and then spreading the upper cushion surface to the upper surface of the lower cushion surface in an alignment manner. Generally, the upper cushion surface is any one of a polyester fabric, and a mutispandex or a PU (poly urethane) composite fabric (also known as PU leather). The upper cushion surface has certain elasticity, and can be stretched to four sides of the material to generate a balanced force, so that the upper cushion surface can be well combined with the lower cushion surface to form the upper cushion body; and at the same time, the lower cushion surface can also be well combined with the lower cushion body to maintain the stability of the manufactured airbag cushion.

The upper cushion surface and the lower cushion surface are laminated to form the upper cushion body, which breaks through the limitation that the existing airbag cushion is only made of latex or plastic, and increases the firmness and stability of the airbag cushion.

Further, in step 2, the specific operation is: S2: placing the material manufactured in step 1 on a laminating machine for laminating and molding, the laminating machine being provided with three front and rear rollers, respectively a front roller, a rear pressure roller and a winding roller, wherein the temperature of the front roller is between 60° C. and 120° C., and the temperature of the rear pressure roller is normal temperature or 90° C.

Further, in step 3, the specific operation is: S3: placing the material I laminated in S2 for more than 24 hours for cooling and shrinkage;

S4: preparing a movable first jig, fixing the material I molded in S3 to the first jig, putting the material I into an oven of 180° C. to 220° C. and baking the material I for 60-120 seconds;

Specifically, the edge of the molded material I is perforated, a plurality of positioning columns are disposed on the frame of the first jig, and the holes at the edge of the material I correspond to the positioning columns to fix the material I for braking and subsequent processing;

S5: preparing a first male mold and a first female mold, placing and fixing the first male mold and the first female mold on an oil hydraulic press, and sheathing and engaging the first jig on which the material I is baked in S4 around a mold frame of the first female mold;

S6: preparing a second jig which area is larger than the first female mold and preparing a material II corresponding to the area of the second jig, fixing the material II with the second jig with a clip, and then spraying water onto the material II uniformly until thoroughly wet;

S7: placing the second jig fixed with the material II in S6 on the upper surface of the first jig, and ensuring that the material II completely covers the first jig;

S8: die-casting with the oil hydraulic press for 80 to 250 seconds to obtain the upper cushion body having a plurality of airbags and air channels connecting the airbags with the outside.

Further, in step 5, the specific operation is: S9: preparing a second female mold, fixing the second female mold on a high-frequency machine, and placing the upper cushion body manufactured in S8 on the second female mold while the airbags are downward and correspond to recessed holes of the second female mold one to one;

S10: preparing the lower cushion body and an insulating fabric, covering the upper cushion body placed in S9 with the lower cushion body in an alignment manner, and then covering the lower cushion body with the insulating fabric in an alignment manner; the materials of the lower cushion body and the lower cushion surface being the same;

S11: preparing a second male mold, fixing the second male mold on the high-frequency machine, operating the high-frequency machine correctly, and completing the lamination of the upper cushion body of S9 and the lower cushion body of S10 by means of electric waves;

After the lamination, an air filling device is used to fill air or liquid through reserved air inlets, the air volume during air or liquid filling being controlled to 60-90% of the air volume when the airbags can bear the maximum pressure. The air volume is usually determined according to the specific requirements of a product. After the filling, the air inlets and air intercepting ports of each group of air chambers are compressed and completely sealed by the high-frequency machine to obtain an airbag cushion.

In step 6, the specific operation is: S12: placing the airbag cushion manufactured in S11 on a fusing machine, and cutting leftover materials to obtain a finished product.

The upper cushion surface and the lower cushion surface are laminated to obtain the material I, and positioning holes are provided on four sides of the material I. At the same time, positioning columns are fixedly connected to the upper surface of the first jig, and the positioning columns match the positioning holes to facilitate positioning and fitting.

Further, the first male mold includes a first base and first cooling water holes, the first cooling water holes pass through the first base, positioning lugs are connected to four corners of the upper surface of the first base, the first base is provided with positioning column holes, airbag lugs are disposed on the first base between the positioning column holes, air channel lugs are connected between the airbag lugs, air inlet lugs are connected to one side of the upper surface of the first base, and the air inlet lugs are connected to one side of the airbag lugs; the first female mold includes a second base and second cooling water holes, the second cooling water holes pass through the second base, positioning recessed holes are formed on four corners of the second base, a mold frame is formed on the upper surface of the second base, the second base in the middle of the mold frame is provided with airbag recesses, air channel recesses are connected between the airbag recesses, one ends of the airbag recesses are connected with air inlet recesses, at least two airbag recesses form a group of convection air chamber recesses, and each group of convection air chamber recesses is connected by an air intercepting recess.

An anti-gravity balance massage type buffer convection airbag cushion is manufactured by the above process and includes a plurality of airbags, convection units are formed among the airbags, each of the convection units is composed of more than two airbags, and the adjacent airbags in the convection units are connected by air channels, such that air can flow among the airbags to produce the effects of convection and balance.

Further, the airbag cushion also includes airbag units, the airbag units are constituted by single independent airbags, gaskets or pads are disposed in the airbags of the airbag units, and the gaskets or pads occupy at least part of spaces of the airbags to support the human body.

Furthermore, the gaskets or pads are made of a flexible material to achieve a good buffering effect and supportability.

Further, the surface of the airbag is provided with at least one non-slip protrusion to prevent the airbag from slipping and maintain the stability.

In the manufacturing process, the airbags may be disposed not only on the upper cushion body but also on the lower cushion body, that is, the airbags may be disposed on the upper and lower surfaces of the airbag cushion to achieve a better convection effect. When manufacturing, the structure only needs to be manufactured by the die-casting molding with the same method for the lower cushion body and the upper cushion body.

Compared with the prior art, the process for producing an anti-gravity balance massage type buffer convection airbag and the airbag cushion proposed by the present invention have the advantages: the upper cushion body and the lower cushion body are laminated by means of electric waves of the high-frequency machine to form a sealed structure, so the connection is firm; the upper cushion body and the lower cushion body are provided with upper airbags and lower airbags to form entire airbags together, the airbags are connected by air channels to achieve buffer convection between the airbags, and the airbags achieve the effects of massage, buffering and pressure reduction accordingly.

At the same time, breathable spaces are reserved between the airbags, so the comfort is good. The air inlets are used for inflation, and the air inlets and the air intercepting ports of each group of air chambers are compressed and completely sealed by the high-frequency machine, so as to ensure the stability of the entire airbags and avoid air leakage.

In addition, the air cushion can be used for shoulder strap type shoulder pads, household seat cushions and lumbar cushions, medical mattresses, pillows, automotive safety belts, seat cushions and lumbar cushions, outdoor sports knee pads and wrist guards, shoe pads, motorcycle pads, bicycle mats, etc., different appearance shapes and airbag sizes are designed according to different products, and different convection air chambers of more than two airbags are constituted to achieve a balanced force and a wide range of use.

Figure 1:
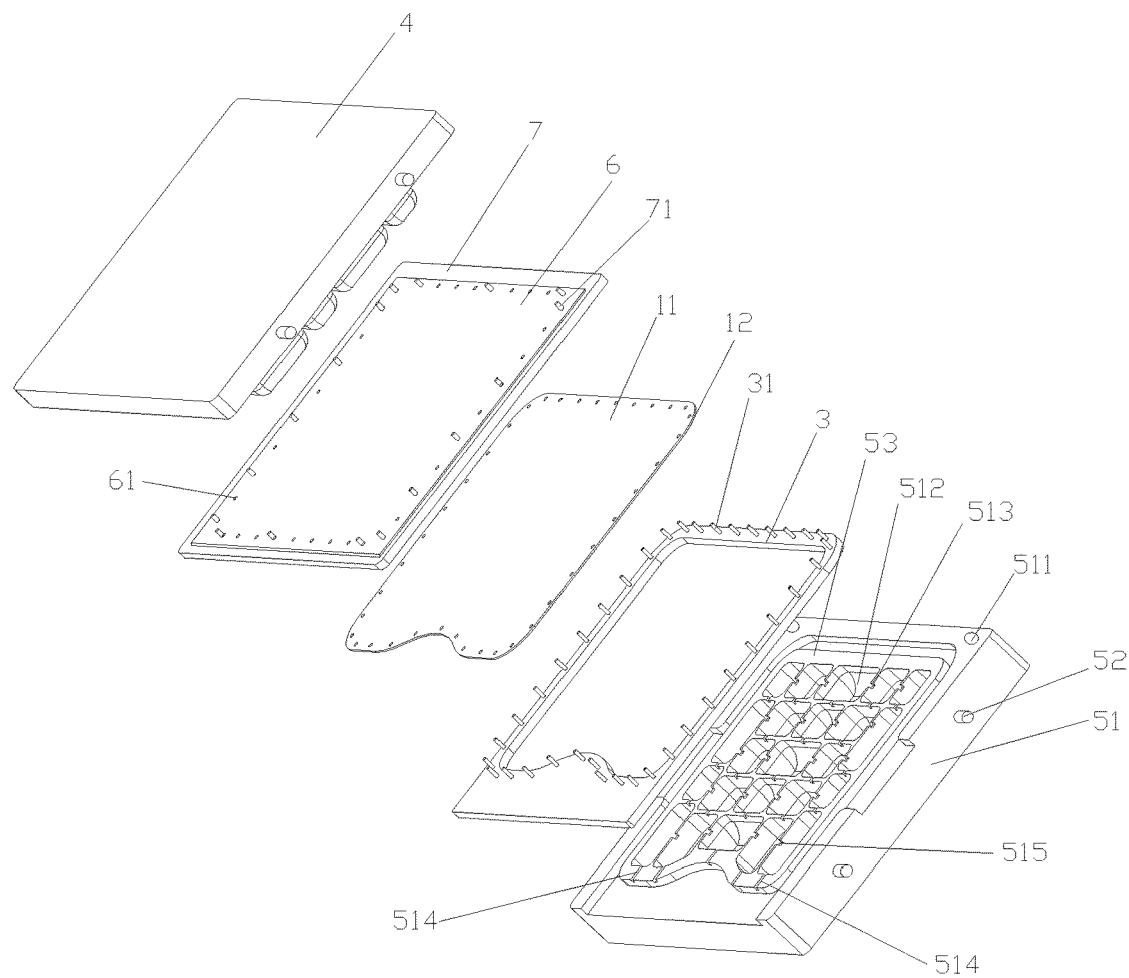
FIG. 1 is an exploded view of a mold jig for manufacturing an upper cushion body according to the present invention.

In the figures: 1, upper cushion body; 11, upper cushion surface; 12, lower cushion surface; 13, upper airbag chamber; 14, air channel; 15, air inlet; 16, airbag; 17, air intercepting port; 2, lower cushion body; 21, lower airbag; 3, first jig; 31, positioning column; 4, first male mold; 41, first base; 411, positioning column hole; 42, first cooling water hole; 43, airbag lug; 44, air channel lug; 45, air inlet lug; 46, positioning lug; 47, air intercepting raised slot; 5, first female mold; 51, second base; 511, positioning recessed hole; 512, airbag recess; 513, air channel recess; 514, air inlet recess; 515, air intercepting recess; 52, second cooling water hole; 53, mold frame; 6, polyester elastic fabric; 61, positioning hole; 7, second jig; 71, positioning column.

DETAILED DESCRIPTION OF EMBODIMENTS

In order to make the objectives, technical solutions and advantages of the present invention clearer, the following further describes the present invention in detail in combination with the accompanying drawings and embodiments. It should be understood that the specific embodiments described herein are only used for interpreting the present invention, rather than limiting the present invention.

The core technical solution of the present invention is as follows:

A process for producing an anti-gravity balance massage type buffer convection airbag, including the following steps:

Step 1: preparing materials for preparing cushion surfaces required for producing the airbag;

Step 2: laminating and molding the cushion surfaces to obtain a material I;

Step 3: preparing an upper cushion body;

The upper cushion body is obtained by die-casting molding; the material II is an elastic fabric and can thus be stretched and completely cover the material I; by spreading the material II, the material II can be isolated from the die-casting mold, and the material II can be prevented from being adhered to the die-casting mold; after the die-casting molding, the material II is removed to obtain the upper cushion body; the material II is an isolation article, and mainly functions to isolate the material I from the die-casting mold, to prevent the material I from being adhered to the mold, and also to prevent the material I and the material II from being adhered together;

Step 4: preparing a lower cushion body;

Step 5: laminating the upper cushion body and the lower cushion body;

Step 6: shaping to obtain a finished product.

There are two types of finished airbag cushions with and without an air nozzle. Airbags of the airbag cushion with an air nozzle may not be filled with air or liquid, and such airbag cushion is obtained by shaping after the upper cushion body and the lower cushion body are laminated. If the airbag cushion is not provided with an air nozzle but provided with an inflation port, the airbag cushion is also obtained by shaping after laminating. If the airbag cushion is not provided with an air nozzle or an inflation port, the airbags need to be inflated. For the airbag cushion that needs to be filled with air or liquid, an air filling device is used to fill the air or liquid, and air channels between the airbags that need to be isolated, the air nozzle and the air channels are sealed after the filling.

There are at least two structural forms of the air nozzle: one is an ordinary air nozzle that is vertically inflated, and the other is an air nozzle with a 90° air inlet. The two types of air nozzles can be used in the airbag cushion. Other types of air nozzles may also be used in the airbag cushion without affecting the function and use of the airbag cushion.

An anti-gravity balance massage type buffer convection airbag cushion is manufactured by the above process and includes a plurality of airbags, convection units are formed among the airbags, each of the convection units is composed of more than two airbags, and the adjacent airbags in the convection units are connected by air channels, such that air can flow among the airbags to produce the effects of convection and balance.

The airbag cushion includes not only the convection units but also airbag units, the airbag units are constituted by single independent airbags, gaskets or pads are disposed in the airbags of the airbag units, and the gaskets or pads occupy at least part of spaces of the airbags, and the gaskets or pads are made of a flexible material to achieve a good buffering effect and supportability.

The specific implementation is as follows with reference to the drawings:

FIG. 1 shows a process for manufacturing an upper cushion body 1 in the first step according to the present invention, where the required molds include a first male mold 4 and a first female mold 5, and a first jig 3, an upper cushion surface 11 and a lower cushion surface 12 are also required.

Figure 2:
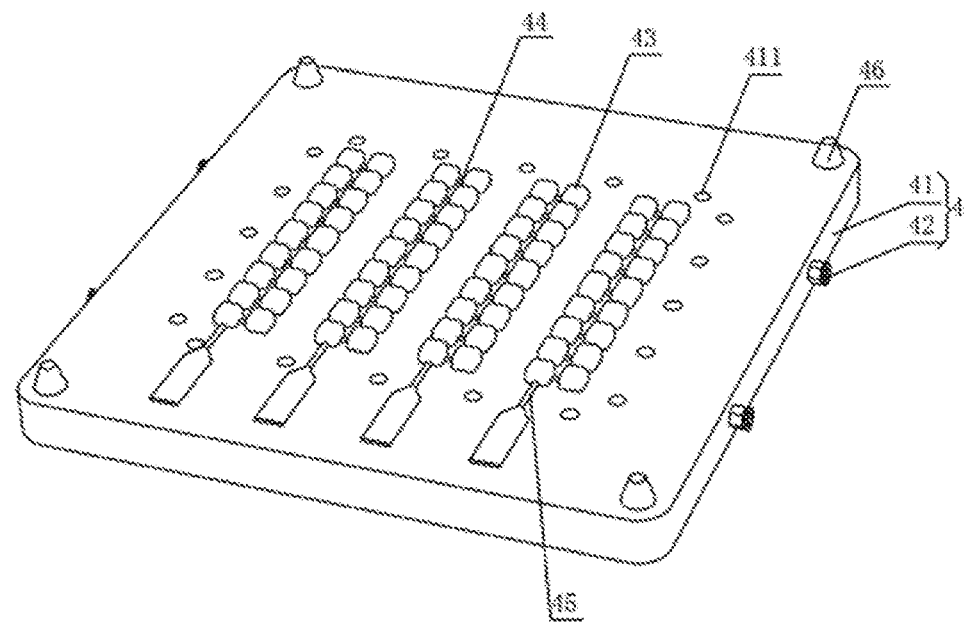
FIG. 2 is a schematic structural diagram of a first male mold according to the present invention.
Figure 3:
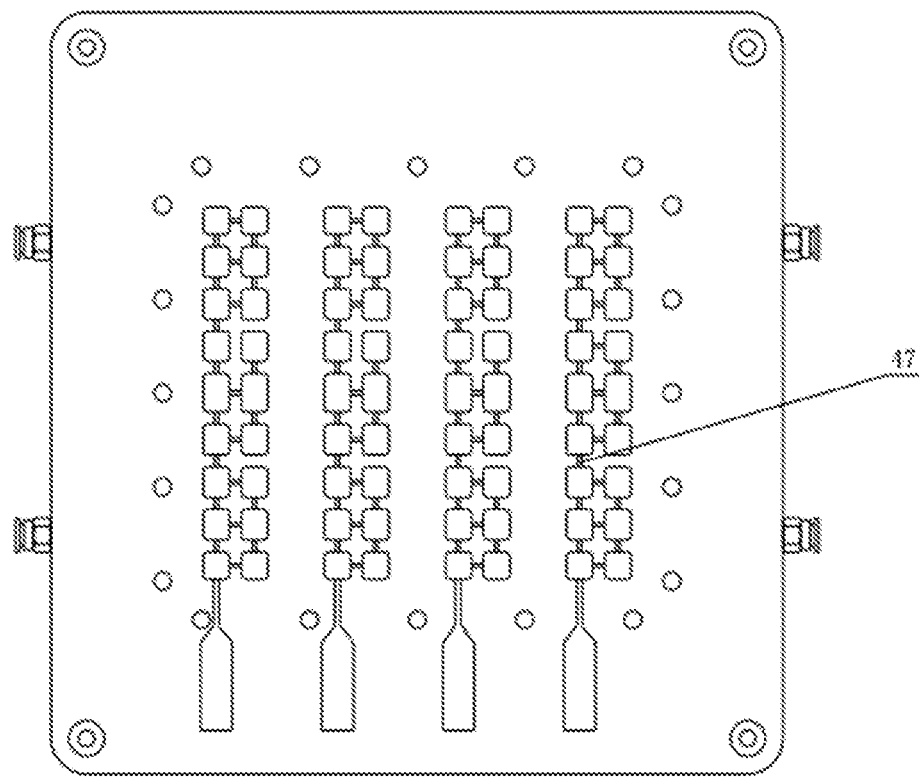
FIG. 3 is a schematic plan view of a first female mold according to the present invention.

FIG. 2 is a three-dimensional diagram of the first male mold 4, and FIG. 3 is a top view of the first male mold 4. In order to clearly show the applicable conditions, another structural form of the first male mold 4 shown in FIG. 2 and FIG. 3 is different from that of FIG. 1, but has the same function as that of FIG. 1.

In order to better describe the process for producing an anti-gravity balance massage type buffer convection airbag cushion, this embodiment provides a process for producing an anti-gravity balance massage type buffer convection airbag cushion, including the following steps in combination with FIGS. 1-3:

S1: an upper cushion surface 11 and a lower cushion surface 12 are prepared, the upper surface of the lower cushion surface 12 is first smeared with a hot-melt adhesive uniformly, and then the upper cushion surface 11 is spread on the upper surface of the lower cushion surface 12 in an alignment manner. Generally, the upper cushion surface is any one of a polyester fabric, and a mutispandex or a PU (poly urethane) composite fabric (also known as PU leather). The lower cushion surface 12 has certain elasticity, and can be stretched to four sides of the material to generate a balanced force, so that the upper cushion surface can be well combined with the lower cushion surface 12 to form an upper cushion body 1; and at the same time, the lower cushion surface 12 can also be well combined with a lower cushion body 2 to maintain the stability of the manufactured airbag cushion.

The upper cushion surface and the lower cushion surface are laminated to form the upper cushion body, which breaks through the limitation that the existing airbag cushion is only made of latex or plastic, and increases the firmness and stability of the airbag cushion.

S2: the material manufactured in S1 is placed on a laminating machine (the laminating machine refers to a device for laminating two layers of base materials, which is the prior art) for laminating, the laminating machine being provided with three rollers, respectively a front roller, a rear pressure roller and a winding roller, wherein the temperature of the front roller is between 60° C. and 120° C., the temperature of the rear pressure roller is natural temperature or 90° C., specifically, when PU rubber is used, the temperature of the front roller is between 60° C. and 120° C., and the temperature of the rear pressure roller is natural temperature; when PU rubber is used, the temperature of the front roller is between 60° C. and 120° C., and the temperature of the rear pressure roller is 90° C.; thus, the purposes of infiltrating the upper cushion surface 11 and the lower cushion surface 12 mutually into capillary pores during lamination and increasing the density and adhesion of the materials are achieved; after the upper cushion surface 11 and the lower cushion surface 12 are laminated, positioning holes are formed on four sides;

S3: the material laminated in S2 is placed for more than 24 hours for cooling and shrinkage;

S4: a movable first jig 3 is prepared, positioning columns 31 are fixedly connected to the upper surface of the first jig 3, and the positioning columns 31 match the positioning holes 111; the material molded in S3 is fixed to the first jig 3, put into an oven of 180 to 220° C. and baked for 60-120 seconds;

S5: a first male mold 4 and a first female mold 5 are prepared, the first male mold 4 includes a first base 41 and first cooling water holes 42, the first cooling water holes 42 pass through the first base 41, positioning lugs 46 are connected to four corners of the upper surface of the first base 41, the first base 41 is provided with positioning column holes 411, airbag lugs 43 are disposed on the first base 41 between the positioning column holes 411, air channel lugs 44 are connected between the airbag lugs 43, every six airbag lugs 43 form a group of convection air chamber raised slots, each group of convection air chamber raised slots is connected by an air intercepting raised slot 47, air inlet lugs 45 are connected to one side of the upper surface of the first base 41, and the air inlet lugs 45 are connected to one side of the airbag lugs 43; the first female mold 5 includes a second base 51 and second cooling water holes 52, the second cooling water holes 52 pass through the second base 51, positioning recessed holes 511 are formed on four corners of the second base 51, a mold frame 53 is formed on the upper surface of the second base 51, the second base 51 in the middle of the mold frame 53 is provided with airbag recesses 512, air channel recesses 513 are connected between the airbag recesses 512, one ends of the airbag recesses 512 are connected with air inlet recesses 514, every six airbag recesses 512 form a group of convection air chamber recesses, and each group of convection air chamber recesses is connected by an air intercepting recess 515; the airbag lugs 43, the air channel lugs 44, the air inlet lugs 45, and the air intercepting raised slots 47 match the airbag recesses 512, the air channel recesses 513, the air inlet recesses 514, and the air intercepting recesses 515 respectively, to press airbags 16 and air intercepting ports 17; the first male mold 4 and the first female mold 5 are placed and fixed on an oil hydraulic press, and the first jig 3 on which the material is baked in S4 is sheathed around the mold frame 53 of the first female mold 5 and engaged;

S6: a second jig which area is larger than that of the first female mold 5 and a polyester elastic fabric 6 corresponding to the area of the second jig are prepared, the polyester elastic fabric 6 is fixed to the second jig 7 (the second jig 7 is of a frame structure, a plurality of positioning columns 71 are disposed on the frame, a plurality of positioning holes 61 corresponding to the positioning columns are also formed in the circumference of the polyester elastic fabric 6, and the positioning columns 71 pass through the polyester elastic fabric 6 through the positioning holes 61 to fix the polyester elastic fabric 6), and then water is sprayed onto the polyester elastic fabric 6 uniformly by using a sprayer until thoroughly wet;

S7: the second jig 7 fixed with the polyester elastic fabric in S6 is placed on the upper surface of the first jig 3, and the polyester elastic fabric 6 is ensured to cover the first jig 3 completely;

S8: die-casting is performed by the oil hydraulic press for 80 to 250 seconds to obtain the upper cushion body 1, wherein the time is determined according to the stretchability and height of the material, one or a few air inlets 15 are provided on one side of the upper cushion body 1, and each group of air chamber is provided with one or a few air channels 14;

S9: a second female mold is prepared, the second female mold is provided with recessed holes, recesses, and concave-convex grains matching the upper cushion body 1; the second female mold is fixed on a high-frequency machine, and the upper cushion body 1 manufactured in S8 is placed on the second female mold while the airbags 13 are downward and correspond to the recessed holes of the second female mold one to one;

S10: a lower cushion body 2 and an insulating fabric are prepared, the upper cushion body 1 placed in S9 is covered with the lower cushion body 2 in an alignment manner, and then the lower cushion body 2 is covered with the insulating fabric in an alignment manner; the materials of the lower cushion body and the lower cushion surface are the same, so that the both are laminated together, and the laminated structure is stable and will not be easily separated;

S11: a second male mold is prepared, the second male mold is provided with recesses matching the lower cushion body 2 and connected with lugs; the second male mold is fixed on the high-frequency machine, the high-frequency machine is correctly operated, and the lamination of the upper cushion body 1 of S9 and the lower cushion body 2 of S10 is completed by means of electric waves; during the lamination, an air filling device is used to fill air through the reserved air inlets 15, the air volume in the airbags 16 being controlled to 60-90% of the air volume when the airbags can bear the maximum pressure, and the air filling volume is determined according to the specific requirements of a product; the air inlets 15 and the air intercepting ports 17 of each group of air chambers are compressed and completely sealed by the high-frequency machine to obtain an airbag cushion;

Generally, two airbags 16 constitute a group, and six airbags 16 constitute a group in the mold shown in FIG. 3;

after the upper cushion body 1 and the lower cushion body 2 are laminated, an air intercepting port 17 is reserved between the adjacent groups of airbags to facilitate the inflation of the airbags 16 through the air intercepting ports 17; and the air intercepting ports 17 are sealed after the inflation is completed.

S12: the airbag cushion manufactured in S11 is placed on a fusing machine, and leftover materials are cut to obtain a finished product.

Figure 4:
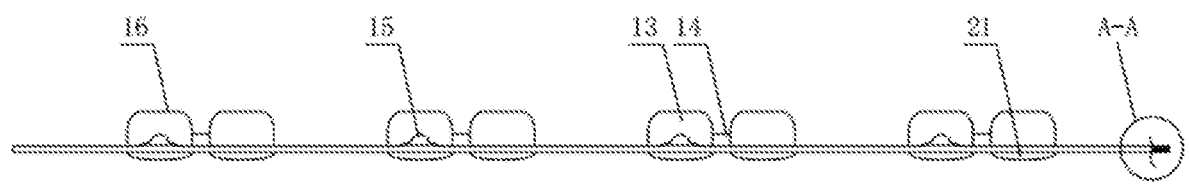
FIG. 4 is a cross-sectional view of a basic structure of an airbag cushion according to the present invention.
Figure 5:
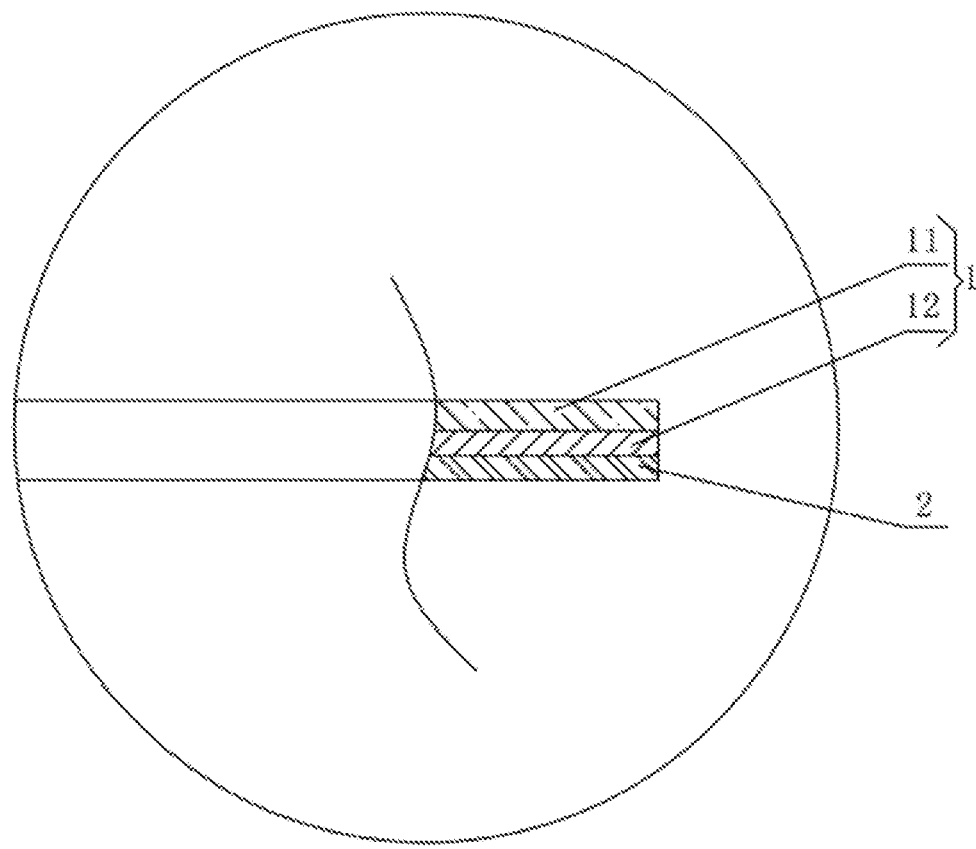
FIG. 5 is an enlarged view of A-A shown in FIG. 4.
Figure 6:
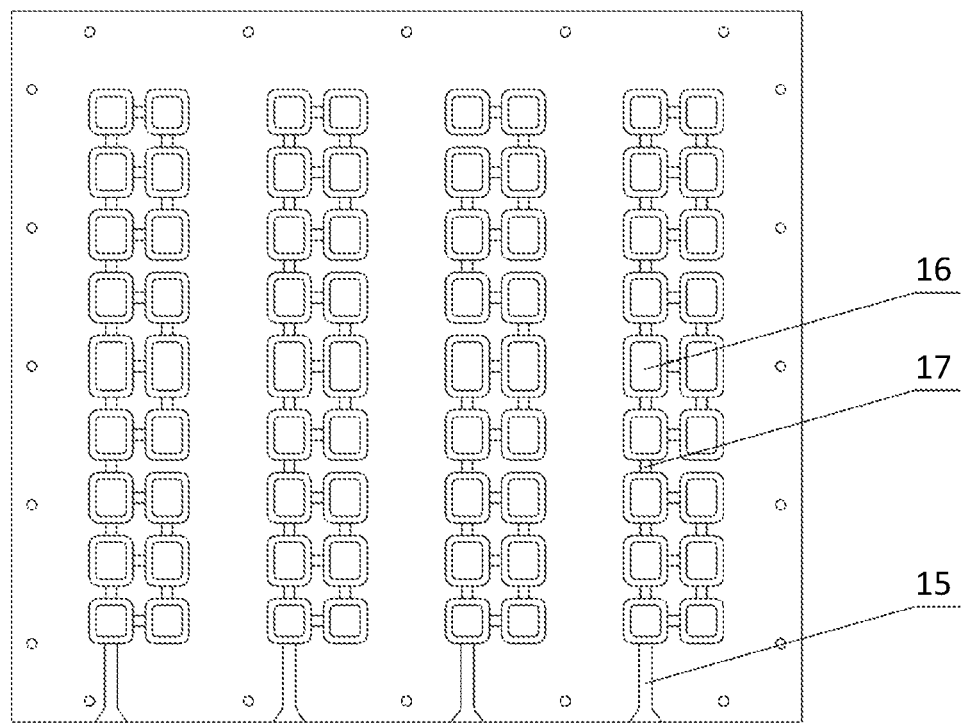
FIG. 6 is a plan view of the upper cushion body in the airbag cushion according to the present invention.

Referring to FIGS. 4-6, an anti-gravity balance massage type buffer convection airbag cushion manufactured by the process of the present invention is shown. The airbag cushion includes an upper cushion body 1, the upper cushion body 1 includes an upper cushion surface 11 and a lower cushion surface 12, the lower surface of the upper cushion surface 11 is fixedly bonded to the upper surface of the lower cushion surface 12, the surface of the upper cushion surface 11 is provided with regular concave-convex grains to facilitate the bonding with the lower cushion surface 12, the upper cushion surface 11 and the lower cushion surface 12 are laminated with a hot-melt adhesive to ensure the tightness of bonding, the material used for the upper cushion surface 11 is usually a fabric, such as a polyester elastic fabric or a mutispandex or a PU composite fabric, and the lower cushion surface 12 has certain elasticity and can be stretched to four sides of the material. In the following implementations, the specific material of the lower cushion surface 12 is thermoplastic polyurethane (TPU) elastomer rubber or ethylene-vinyl acetate copolymer (EVA), and the thickness of the lower cushion surface 12 is 0.5 mm or more (the thickness of the material is determined according to the stretched height). When the material of the lower cushion surface 12 is EVA, its thickness is increased according to the stretched thickness, and its hardness is 80 to 90 SH. When the material of the upper cushion surface 11 is a polyester elastic fabric, its thickness is 0.8 mm, the polyester elastic fabric is elastic all round, and resists high temperatures of more than 200° C. When the material of the upper cushion surface 11 is a fingerprint fabric, its thickness is between 0.4 mm and 0.5 mm to ensure the quality of the airbag cushion.

Similarly, the material used for the lower cushion body 2 is the same as that for the lower cushion surface 12, so that the two are well and firmly combined to maintain the stability and reliability of the manufactured airbag cushion and avoid the separation of the airbags under the effect of pressure.

Embodiment 1

As shown in FIGS. 4-6, this embodiment describes an airbag cushion manufactured according to the above method. The airbag cushion is a strip-shaped air cushion. The air cushion comprises an upper cushion surface 11, a lower cushion surface 12, and a lower cushion body 2, wherein the upper surface of the lower cushion surface 12 is provided with upper airbag chambers 13 distributed uniformly, and air channels 14 are connected between the upper airbag chambers 13, thereby forming convection; and each upper airbag chamber 13 bulges when inflated. Air inlets 15 are connected to corners of the lower cushion surface 12, the air inlets 15 are fixedly connected to one ends of the upper airbag chambers 13, the lower cushion body 2 is bonded to the lower surface of the lower cushion surface 12, the lower cushion body 2 and the lower cushion surface 12 are made of the same material, the thickness of the lower cushion body 2 is 0.4 to 0.5 mm, the upper airbag chambers 13 are sealed by the lower cushion body 2 after inflation to form airbags 16, and the lower cushion body 2 is laminated with the upper cushion body 1 by a high-frequency machine to form a sealed structure.

The air cushion has four rows of convection units, each row has three convection units, and each convection unit is composed of six airbags 16 connected to each other. This embodiment can be applied to shoulder straps of a backpack or a school bag to protect the shoulders, and can be made into a detachable form.

Embodiment 2

Figure 7:
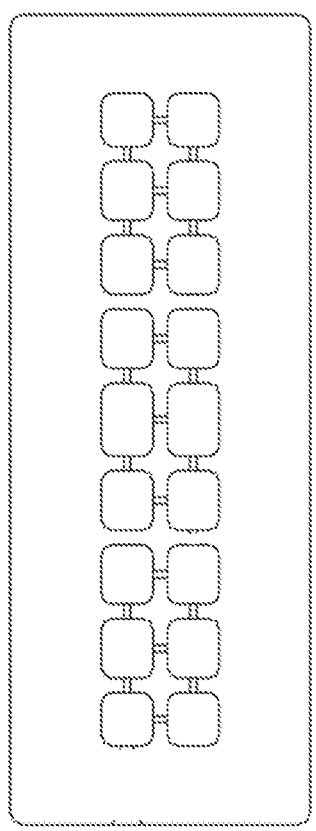
FIG. 7 is a structural diagram of Embodiment 2 according to the present invention.

Referring to FIG. 7, an airbag cushion manufactured according to the above method is shown. The airbag cushion is a strip-shaped air cushion. From the perspective of the upper cushion body 1, the airbags 16 in this air cushion are arranged in two rows, six adjacent airbags 16 form a convection unit, every two airbags in a convection unit are connected by an air channel 14, and the convection units are separated from each other. Compared with the first embodiment, when this embodiment is applied to shoulder straps of a backpack, the air cushion is designed in two rows on the shoulder straps of the backpack. During production, the corresponding airbag lugs 43 and airbag recesses 512 on the first male mold 4, the first female mold 5, the second male mold and the second female mold are arranged in two rows, and one air inlet recess 514 and one air inlet lug 45 are provided.

Figure 8:
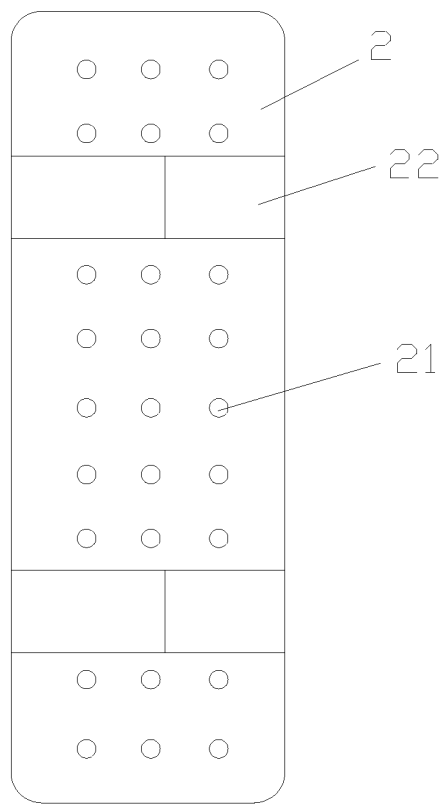
FIG. 8 is a rear view of the mode shown in FIG. 7.

FIG. 8 is a rear view of the strip-shaped air cushion shown in FIG. 7. As shown in the figure, from the side of the lower cushion body 2, bands 22 are disposed on two sides of the lower cushion body 2 (the bands 22 can be bonded together by magic tapes). At the same time, a plurality of small protrusions 21 are provided on the surface of the lower cushion body 2, and these small protrusions 21 have a non-slip effect. When the air cushion is disposed on the shoulder straps of the backpack through the bands 22, the stability of the air cushion and the shoulder straps is maintained, and the displacement of the air cushion during constant friction is avoided.

According to the above method, the air cushion has three convection units, each of the convection units is composed of six airbags 16 connected to each other, and the air cushion can be made into a detachable form.

Embodiment 3

Figure 9:
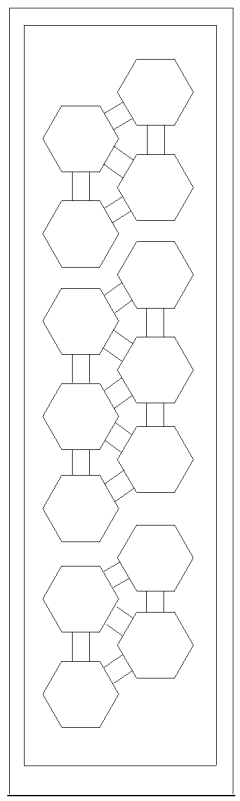
FIG. 9 is a structural diagram of Embodiment 3 according to the present invention.

Referring to FIG. 9, an airbag cushion manufactured according to the above method is shown. The airbag cushion is another strip-shaped air cushion. This embodiment is specifically a strip-shaped backpack strap air cushion. In this embodiment, there are two rows of airbags, the two rows of airbags form three convection units, wherein each of the top and bottom convection units is composed of four airbags 16 connected, and the middle convection unit is composed of six airbags 16 connected to each other. The strip-shaped backpack strap air cushion is applicable to a backpack with long shoulder straps, and can be made into a detachable form.

Embodiment 4

Figure 10:
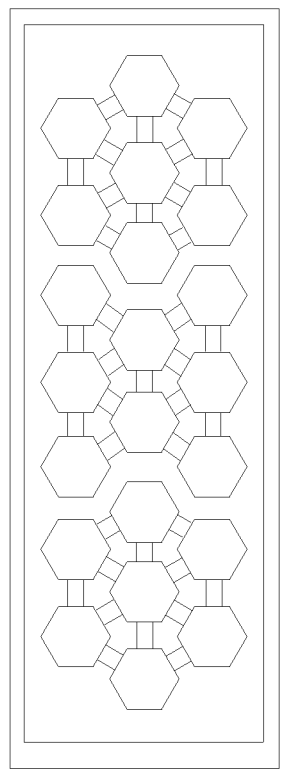
FIG. 10 is a structural diagram of Embodiment 4 according to the present invention.

Referring to FIG. 10, an airbag cushion manufactured according to the above method is shown. The airbag cushion is another strip-shaped air cushion. Compared with the structure shown in FIG. 8, a row of airbags 16 is increased. These airbags 16 form three convection units, each of the top and bottom convection units is composed of seven airbags, and the middle convection unit is composed of nine airbags 16 to support more weight. This air cushion is suitable for wide backpack straps, or heavy backpacks such as traveling bags.

Embodiment 5

Figure 11:
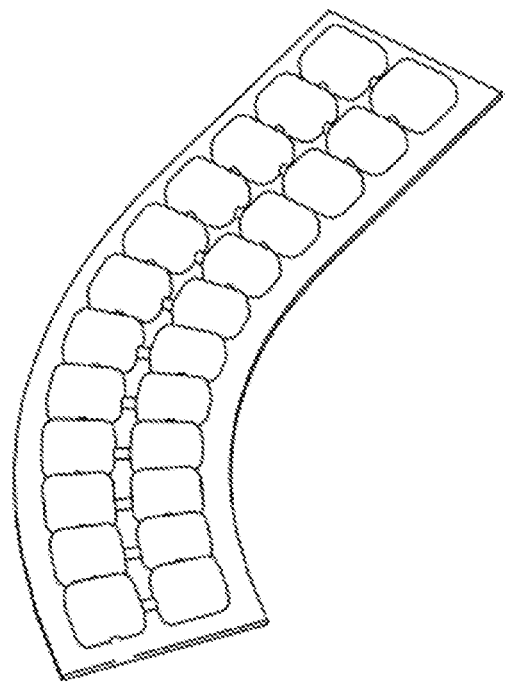
FIG. 11 is a structural diagram of Embodiment 5 according to the present invention.

Referring to FIG. 11, an airbag cushion manufactured according to the above method is shown. The airbag cushion is an S-shaped air cushion. This embodiment is specifically an S-shaped two-row backpack strap air cushion. The overall air cushion is S-shaped, which is more in line with the human body curve, so that the air cushion is more comfortable. This embodiment is specifically a large-arc backpack strap air cushion, and the specific airbag structure is the same as that shown in FIG. 7. Compared with the third embodiment, the air cushion is generally arc-shaped, suitable for people of different body types, but needs to be fixed on shoulder straps of a backpack during use.

Embodiment 6

Figure 12:
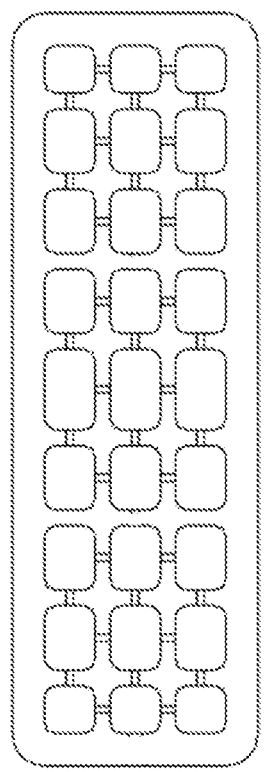
FIG. 12 is a structural diagram of Embodiment 6 according to the present invention.

Referring to FIG. 12, an airbag cushion manufactured according to the above method is shown. The airbag cushion is a backpack strap air cushion. This embodiment is specifically a short three-row backpack strap air cushion. Compared with the second embodiment, the airbags of the air cushion are arranged in three rows in this embodiment, every nine adjacent airbags (3*3) form a convection unit, and the airbags in a convection unit are connected through air channels 14 to obtain a large contact area. The short backpack strap air cushion is suitable for backpacks with wide shoulder straps, adult backpacks, shoulder straps and safety belts, has better comfort, and can be made into a detachable form.

Figure 13:
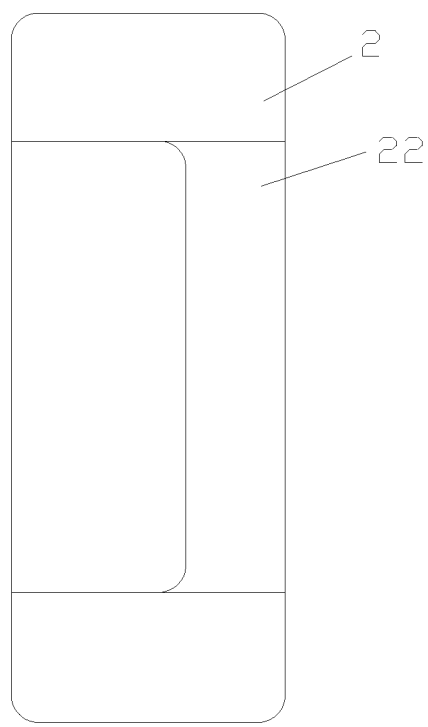
FIG. 13 is a rear view of the mode shown in FIG. 12.

FIG. 13 is a rear view of the strip-shaped air cushion shown in FIG. 12. As shown in the figure, from the side of the lower cushion body 2, wide strip-shaped bands 22 are vertically disposed on two sides of the lower cushion body 2, and the bands 22 can be bonded together by magic tapes.

Embodiment 7

Figure 14:
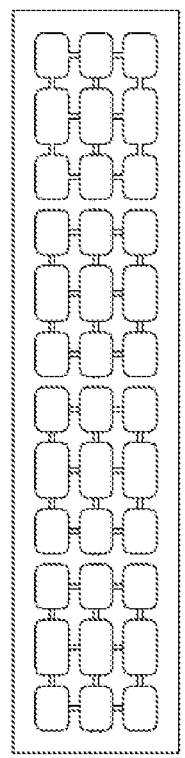
FIG. 14 is a structural diagram of Embodiment 7 according to the present invention.

Referring to FIG. 14, an airbag cushion manufactured according to the above method is shown. The airbag cushion is another backpack strap air cushion. This embodiment is specifically a long three-row backpack strap air cushion. Every nine adjacent airbags (3*3) form a convection unit, and there are a total of four groups of convection units. Compared with the sixth embodiment, the single-row airbags of the air cushion are more than the airbags in the sixth embodiment, and the overall airbag convection units are more than those of the sixth embodiment. The long backpack strap air cushion is suitable for adult backpacks with long shoulder straps and suitable for shoulder straps and safety belts, and can be made into a detachable form with reference to FIG. 8 or FIG. 13.

Embodiment 8

Figure 15:
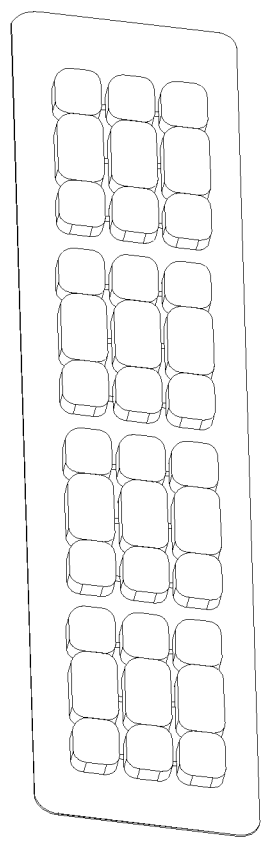
FIG. 15 is a three-dimensional diagram of Embodiment 7 according to the present invention.
Figure 16:
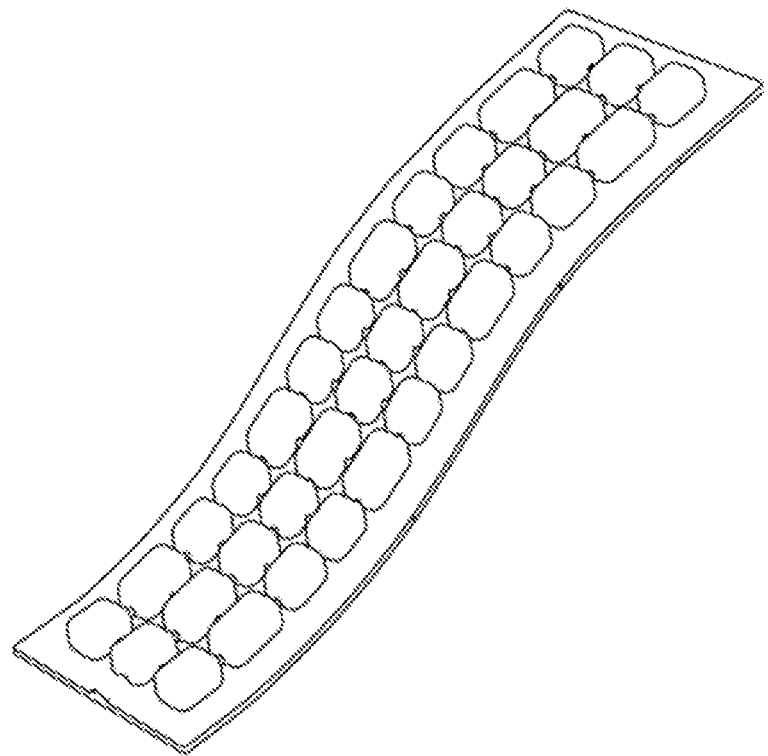
FIG. 16 is a structural diagram of Embodiment 8 according to the present invention.

Referring to FIG. 15 and FIG. 16, an airbag cushion manufactured according to the above method is shown. The airbag cushion is another backpack strap air cushion. This embodiment is specifically an S-shaped three-row backpack strap air cushion. The quantity and arrangement of the airbags are the same as those of FIG. 14. Compared with the seventh embodiment, the air cushion is generally S-shaped, is more in line with the human body curve, but needs to be fixed on shoulder straps of a backpack during use.

Embodiment 9

Figure 17:
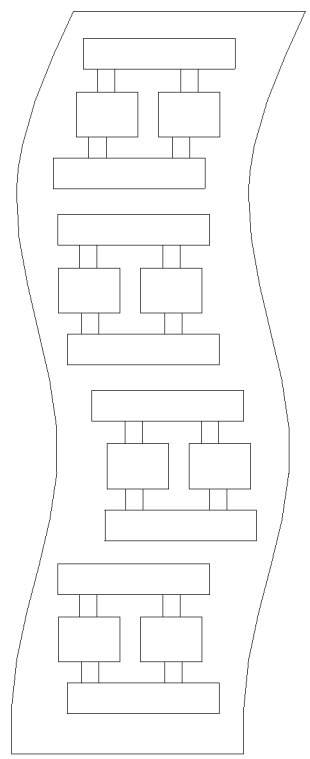
FIG. 17 is a structural diagram of Embodiment 9 according to the present invention.

Referring to FIG. 17, an airbag cushion manufactured according to the above method is shown. The airbag cushion is an S-shaped air cushion. This embodiment is specifically a curved backpack strap air cushion. Compared with the seventh embodiment, the air cushion is generally arc-shaped. Compared with the fifth embodiment, the airbags 16 in this embodiment are made to be square, one horizontal long airbag is connected with two square airbags, and the two long airbags sandwich two square airbags to form a convection unit. This air cushion is suitable for larger people, and is more comfortable.

Embodiment 10

Figure 18:
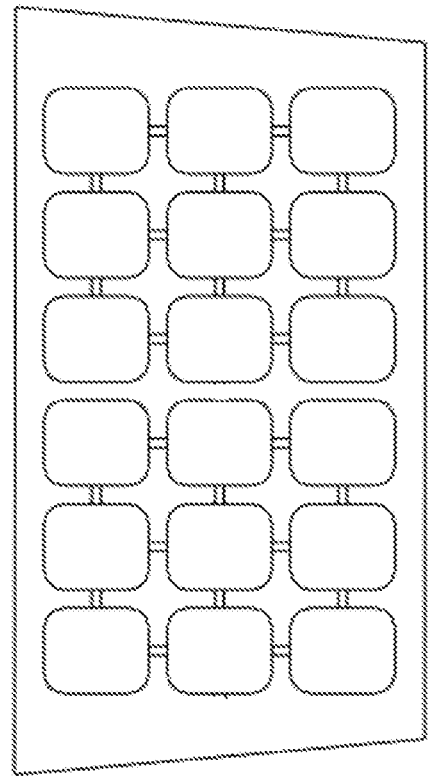
FIG. 18 is a structural diagram of Embodiment 10 according to the present invention.

Referring to FIG. 18, an airbag cushion manufactured according to the above method is shown. The airbag cushion is a backpack waist cushion. This embodiment is specifically a waist air cushion for the back of a student backpack. Compared with the sixth embodiment, there are fewer convection units constituted by the airbags in this embodiment, there are only two groups of convection units, but the airbags are relatively large, so the air cushion is suitable for a student's rear backpack air cushion and is set according to the widths of a student's backpack and the back of a student, thus increasing the comfort of the backpack.

Embodiment 11

Figure 19:
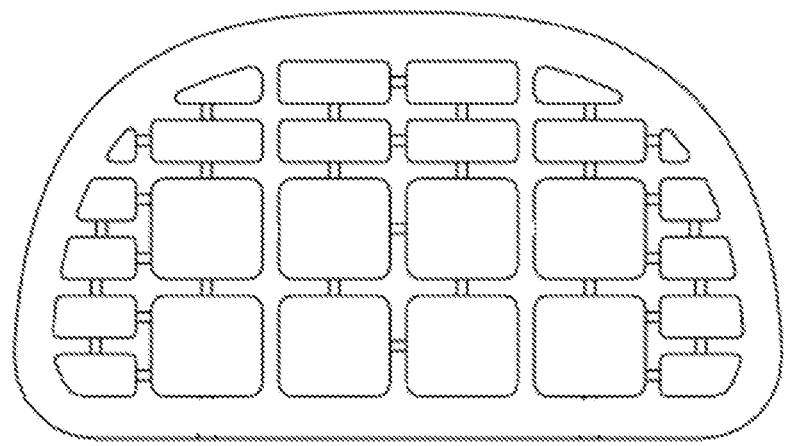
FIG. 19 is a structural diagram of Embodiment 11 according to the present invention.

Referring to FIG. 19, an airbag cushion manufactured according to the above method is shown. The airbag cushion is another backpack air cushion. This embodiment is specifically a backpack back air cushion. Compared with the tenth embodiment, the overall air cushion in this embodiment is arc-shaped, and the airbags have different sizes and are arranged in an arc shape according to the shape of the air cushion. According to the distribution of the convection units, the air cushion is provided with three air inlets 15 for inflating, which accelerates the inflation and ensures that the air volumes of the airbags on two sides are uniform. This air cushion is suitable for adult backpacks.

Embodiment 12

Figure 20:
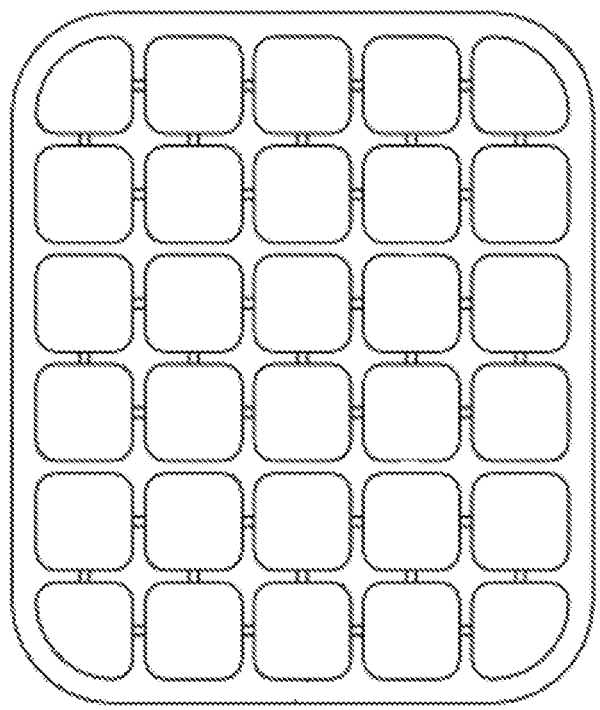
FIG. 20 is a structural diagram of Embodiment 12 according to the present invention.

Referring to FIG. 20, an airbag cushion manufactured according to the above method is shown. The airbag cushion is a backpack waist cushion, and may also be used as a seat cushion. Compared with the tenth embodiment, every ten adjacent airbags in this embodiment form a convection unit, and every two airbags in one convection unit are connected by an air channel 14. The overall seat cushion is rectangular, is suitable for a planar bench, and improves the comfort of sitting.

Embodiment 13

Figure 21:
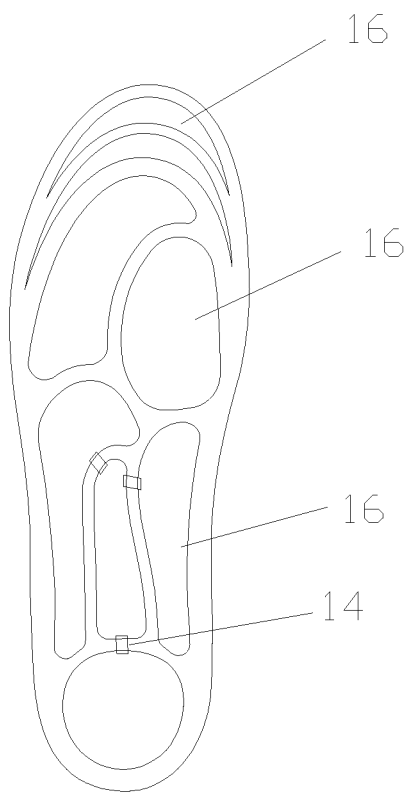
FIG. 21 is a structural diagram of Embodiment 13 according to the present invention.
Figure 22:
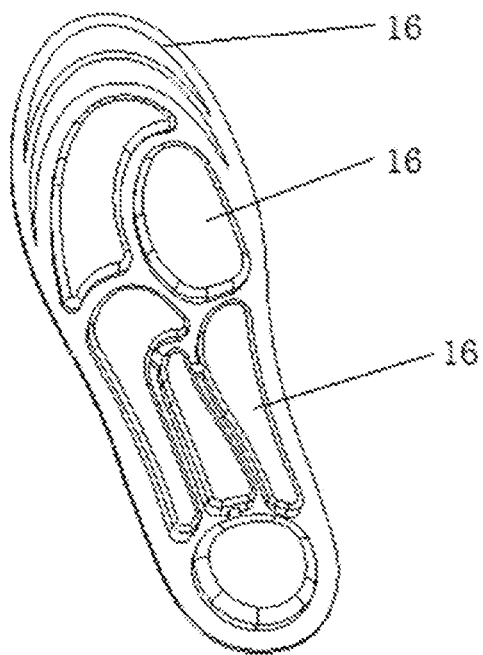
FIG. 22 is a three-dimensional diagram of the mode shown in FIG. 20.

Referring to FIG. 21 and FIG. 22, an airbag cushion manufactured according to the above method is shown. The airbag cushion is another shoe pad. The shoe pad is designed according to the shape of a human foot. The airbags are irregular to meet the needs of human feet and achieve the effects of buffering and massaging. The shoe pad is divided into three parts: front, middle and back. The front part corresponds to toes and includes two arc-shaped strip airbags, the middle part corresponds to the sole and includes two independent large airbags, and the back part is a convection unit formed by connecting a plurality of large airbags together. In this way, the shoe pad can also meet the needs of human feet and achieve the effects of buffering and massaging; and a flexible rubber mat is provided in the airbag 16 at the heel to have a certain supporting force, so that the shoe pad can meet the needs of human feet during exercising to play a buffering role. The product may also be implanted with far infrared or antibacterial materials.

Embodiment 14

Figure 23:
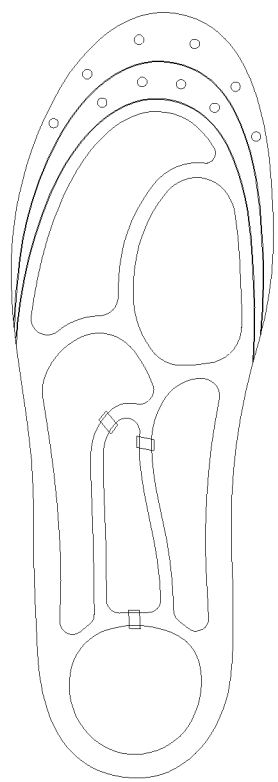
FIG. 23 is a structural diagram of Embodiment 14 according to the present invention.
Figure 24:
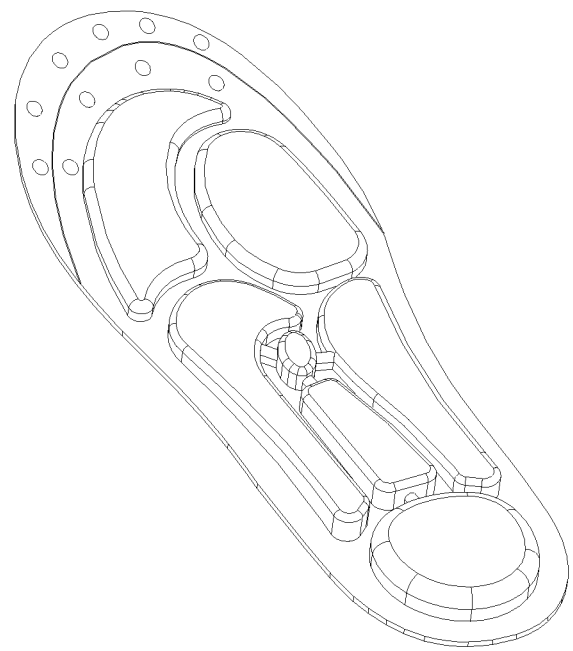
FIG. 24 is a three-dimensional diagram of the mode shown in FIG. 22.

Referring to FIG. 23 and FIG. 24, an airbag cushion manufactured according to the above method is shown. The airbag cushion is a shoe pad. The shoe pad is designed according to the shape of a human foot. The airbags are irregular to meet the needs of human feet and achieve the effects of buffering and massaging. The shoe pad is divided into three parts: front, middle and back. The front part includes air holes and cut lines, and has the function of massage; the middle part corresponds to the sole and includes two independent large airbags; and the back part is a convection unit formed by connecting a plurality of large airbags together, can buffer the heel, has the effect of massaging the foot, and is suitable for different foot types. The product may also be implanted with far infrared or antibacterial materials.

Embodiment 15

Figure 25:
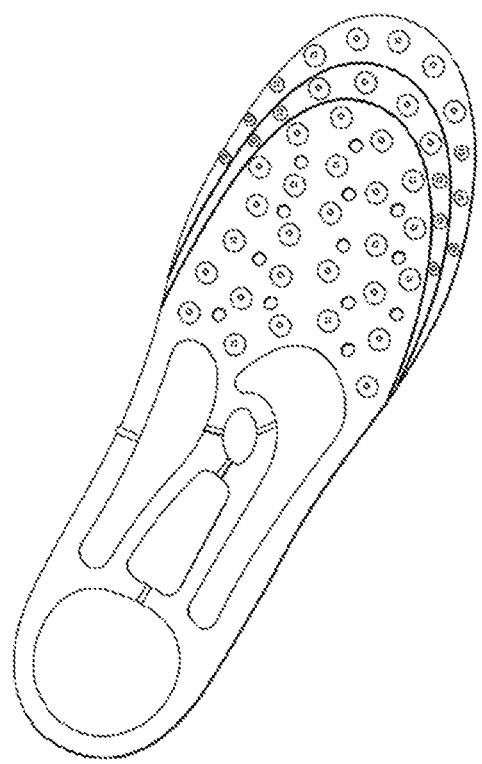
FIG. 25 is a structural diagram of Embodiment 15 according to the present invention.

Referring to FIG. 25, an airbag cushion manufactured according to the above method is shown. The airbag cushion is a shoe pad. The shoe pad is designed according to the shape of a human foot. The airbags are irregular to meet the needs of human feet and achieve the effects of buffering and massaging. The shoe pad is divided into two parts. The front part includes small granular airbags and has the function of massage, and corresponding perforations for ventilation are formed between the small airbags; and the back part is a convection unit formed by connecting a plurality of large airbags together.

Embodiment 16

Figure 26:
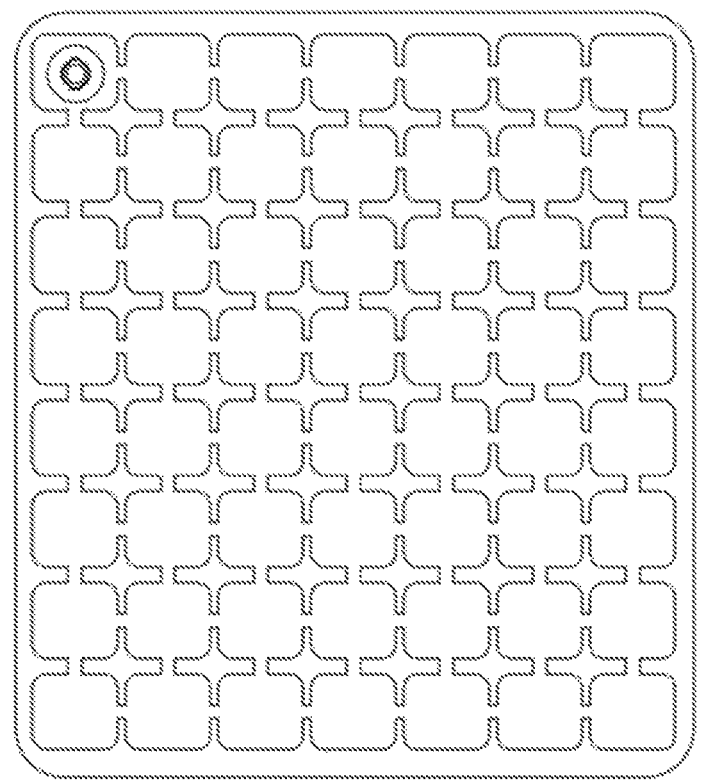
FIG. 26 is a structural diagram of Embodiment 16 according to the present invention.

Referring to FIG. 26, an airbag cushion manufactured according to the above method is shown. The airbag cushion is another seat cushion. This embodiment is specifically a large seat cushion. The seat cushion has fifty-six airbags, and the airbags are evenly distributed in the air cushion. In this embodiment, an inflating device (for example, an air nozzle) is connected to the lower cushion body 2. In this embodiment, the inflating device is used for inflating, and the inflating device is a common air nozzle, and a stopper is provided on the air nozzle to prevent air outflow. When the seat cushion is not used, the seat cushion can be deflated and stored for flexible use. The seat cushion has a larger area, the stress is scattered evenly, and a non-slip fabric may be disposed at the bottom, so that the seat cushion is suitable for heavy people.

Embodiment 17

Figure 27:
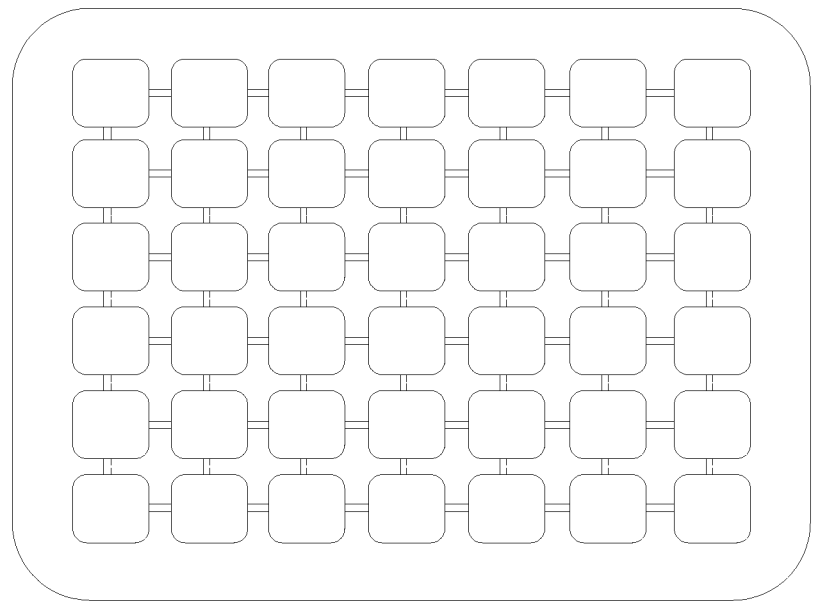
FIG. 27 is a structural diagram of Embodiment 17 according to the present invention.

Referring to FIG. 27, an airbag cushion manufactured according to the above method is shown. The airbag cushion is another seat cushion. This embodiment is specifically a medium seat cushion. The seat cushion has forty-two airbags, and the airbags are evenly distributed on the seat cushion. In this embodiment, an air nozzle (not shown) is connected to the lower cushion body 2. In this embodiment, the air nozzle is used for inflating and is a three-in-one air nozzle, which facilitates deflation, inflation or liquid filling. The seat cushion has a medium area, and is suitable for office, home and the like.

Embodiment 18

Figure 28:
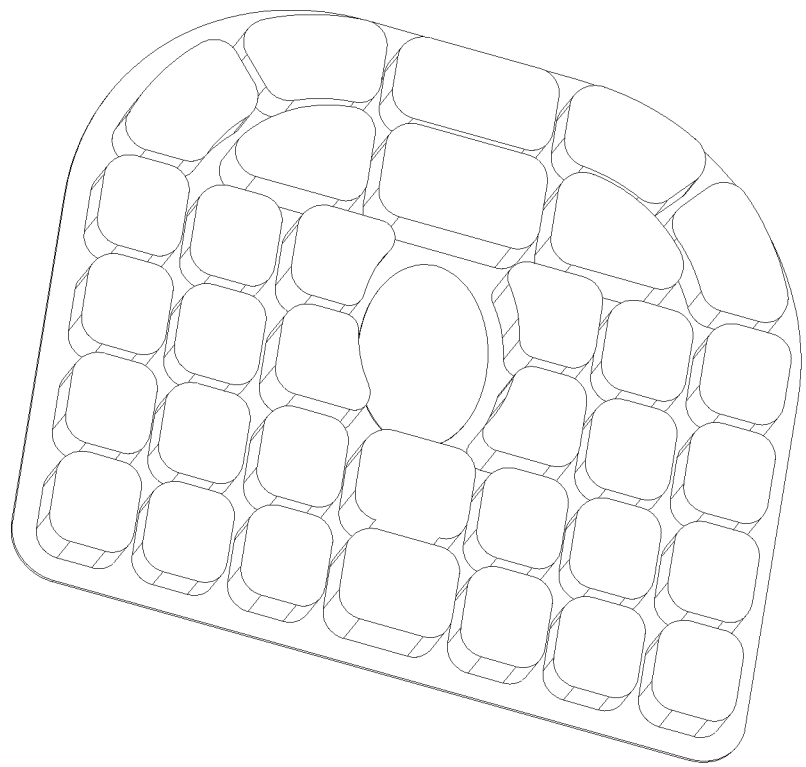
FIG. 28 is a structural diagram of Embodiment 18 according to the present invention.

Referring to FIG. 28, an airbag cushion manufactured according to the above method is shown. The airbag cushion is also a seat cushion, but there is a hollow structure in the middle of the seat cushion, which is at the oval position shown in the figure. This seat cushion is suitable for hemorrhoid patients. The hollow structure in the middle can provide a space for the position of hemorrhoids while supporting the human body. The seat cushion is suitable for office, home and the like.

Embodiment 19

Figure 29:
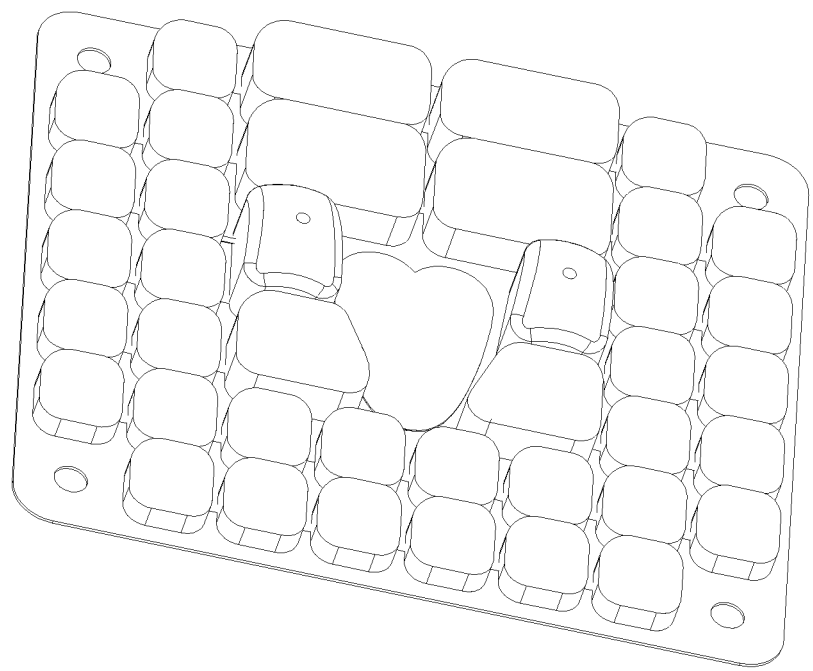
FIG. 29 is a structural diagram of Embodiment 19 according to the present invention.

Referring to FIG. 29, an airbag cushion manufactured according to the above method is shown. The airbag cushion is another hemorrhoid seat cushion as shown in the figure above. There is a hollow structure in the middle of the seat cushion, which is at the heart-shaped position shown in the figure. This seat cushion is suitable for hemorrhoid patients. There is the hollow structure in the middle and four holes on four sides, so that the seat cushion can be tied to a wheelchair with ropes and fixed without slipping. The seat cushion can provide a space for the position of hemorrhoids while supporting the human body. The seat cushion is suitable for office, home and the like.

Embodiment 20

Figure 30:
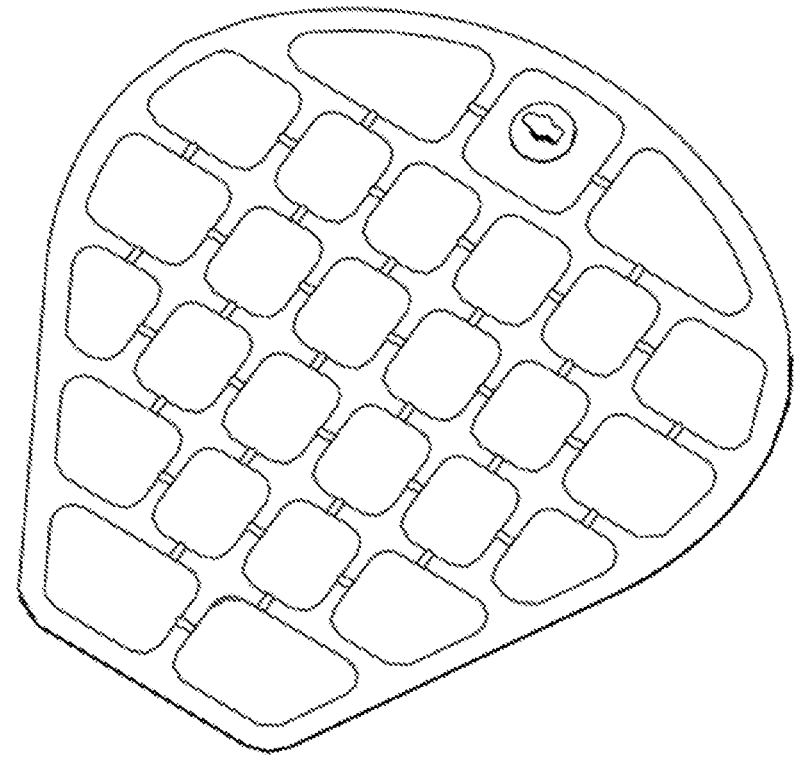
FIG. 30 is a structural diagram of Embodiment 20 according to the present invention.

Referring to FIG. 30, an airbag cushion manufactured according to the above method is shown. The airbag cushion is a motorcycle seat cushion. This embodiment is specifically a motorcycle cushion. Compared with the above embodiments, an inflating device (for example, an air nozzle) is disposed on the lower cushion body 2 in this embodiment. In this embodiment, the inflating device is used for inflating, and a stopper is provided on the inflating device to prevent air outflow. When the seat cushion is not used, the seat cushion can be deflated and stored for flexible use. Ropes may be provided on the back to tie the seat cushion to a motorcycle seat.

Embodiment 21

Figure 31:
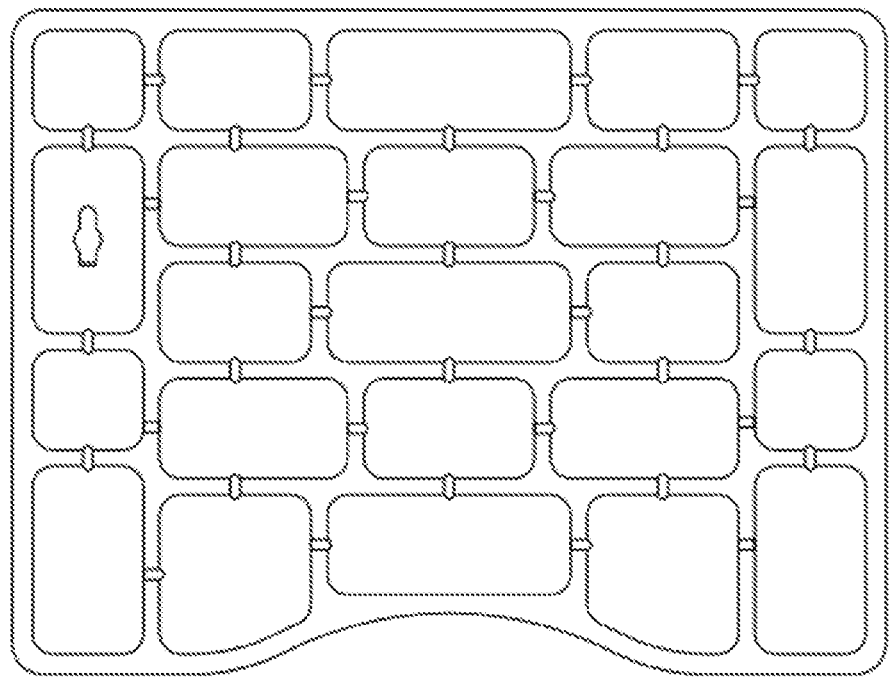
FIG. 31 is a structural diagram of Embodiment 21 according to the present invention.

Referring to FIG. 31, an airbag cushion manufactured according to the above method is shown. The airbag cushion is a pillow-shaped air cushion. This embodiment is specifically a pillow air cushion. Compared with the above embodiments, an inflating device is connected to the lower cushion body 2 in this embodiment. In this embodiment, the inflating device is used for inflating, and a stopper is provided on the inflating device to prevent air outflow. When the air cushion is not used, the air cushion can be deflated and stored for flexible use. The air cushion is mainly designed for the neck, with an exposed inflatable nozzle, which can adjust the height and softness of an air cushion pillow.

Embodiment 22

Figure 32:
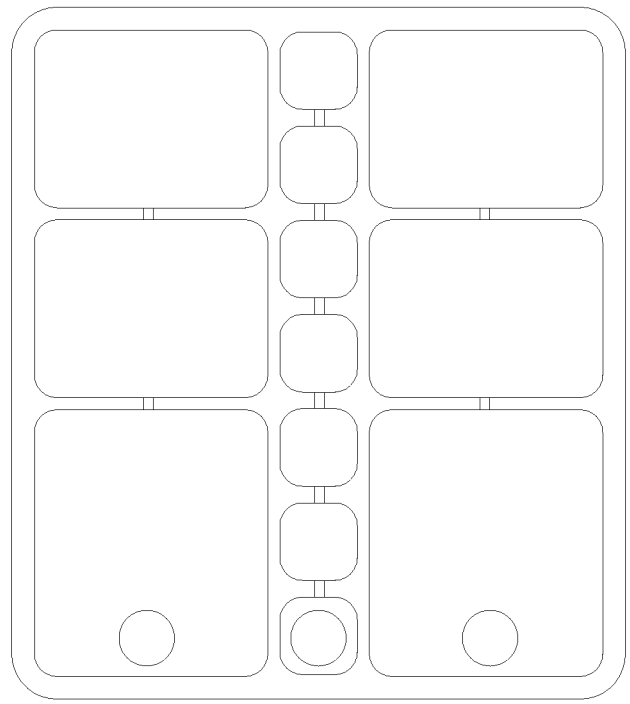
FIG. 32 is a structural diagram of Embodiment 22 according to the present invention.

Referring to FIG. 32, an airbag cushion manufactured according to the above method is shown. The airbag cushion is an air cushion for the waist. This embodiment is specifically a waist cushion. Compared with the above embodiments, the middle airbags are regular small airbags, and the width of the large airbags on two sides corresponds to the width of two or three small airbags in the middle. The air cushion is suitable for waist massage, and increases the area and comfort of massaging the waist.

Embodiment 23

Figure 33:
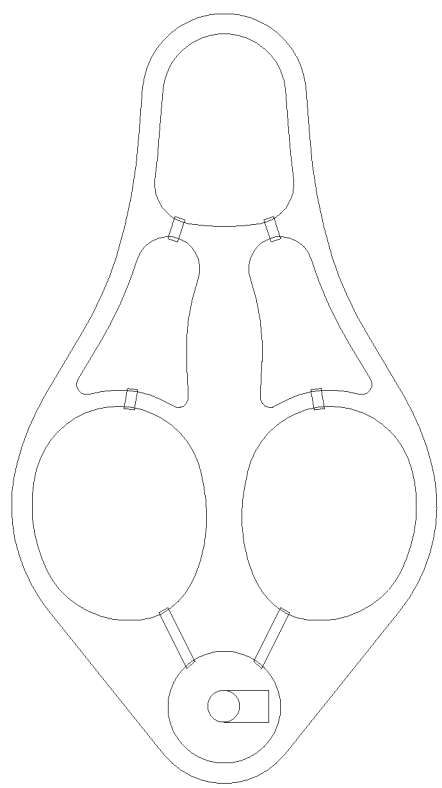
FIG. 33 is a structural diagram of Embodiment 23 according to the present invention.

Referring to FIG. 33, an airbag cushion manufactured according to the above method is shown. The airbag cushion is a bicycle seat cushion. This embodiment is specifically an air cushion for a bicycle. Compared with the above embodiments, the air cushion in this embodiment is composed of large-sized airbags, wherein an inflatable nozzle is disposed on an airbag 16 in the back of the seat cushion, and an inflating device is connected to the inflatable nozzle to fill the seat cushion with air or liquid so as to increase the comfort of the seat cushion.

It should be noted that the airbags are usually inflated to 60-90% of the maximum pressure of the airbags, so that air can be convected, but over-inflated air cannot be convected.

Moreover, in the airbag cushion product, the airbags may be set according to the actual application conditions. The airbags may have different sizes, different heights, different shapes, and the like.

Based on the above, the present invention proposes a process for producing an anti-gravity balance massage type buffer convection airbag and an airbag cushion, where the upper cushion body 1 and the lower cushion body 2 are laminated by means of electric waves of a high-frequency machine to form a sealed structure, so the connection is firm; the upper cushion body 1 and the lower cushion body 2 are provided with upper airbag chambers 13, the upper cushion body 1 and the lower cushion body 2 are laminated to form airbags 16, and the airbags 16 are connected by air channels 14 to realize buffer and convection between the airbags 16, thus achieving the effects of massage, buffer and pressure reduction; air spaces are reserved between the airbags 16 for good comfort; after the airbags 16 are completely sealed, the overall stability is high, and air is unlikely to leak; in addition, the air cushion can be used for shoulder strap cushions, household seat cushions, lumbar cushions, medical mattresses, pillows, automotive safety belts, seat cushions and lumbar cushions, outdoor sports knee pads, wrist pads, shoe pads, motorcycle cushions, bicycle cushions, etc.; according to different products, different appearance shapes and airbag sizes are designed, and different convection air chambers of more than two airbags are constituted to achieve a force balance; and the airbags can be used for filling air or liquid, so the use range is wide.

The above descriptions are specific preferred embodiments of the present invention only, but the protection scope of the present invention is not limited thereto. Any skilled person who is familiar with this art could make equivalent substitutions or variations within the disclosed technical scope of the present invention according to the technical solutions of the present invention and the inventive concepts thereof, and these substitutions or variations shall fall within the protection scope of the present invention.

What is claimed is:

1. A process for producing an anti-gravity balance massage type buffer convection airbag, the process comprising:
   preparing materials comprising preparing different materials for an upper cushion surface and a lower cushion surface for producing the airbag;
   laminating comprising laminating and molding the upper and the lower cushion surfaces to obtain a material I;
   preparing an upper cushion body comprising:
   heating the material I; then covering the material I with a material;
   performing die-casting molding with a mold to obtain the upper cushion body; wherein the material II is an elastic fabric and stretchable to completely cover the material I;
   spreading the material II, isolating the material II from the mold, and preventing the material II from adhering to the die-casting mold;
   removing the material II to obtain the upper cushion body; and
   after the material II is removed from the lower cushion surface, forming grains on the lower cushion surface away from the upper cushion surface, wherein the grains on the lower cushion surface corresponds to grains on the material II;
   preparing a lower cushion body;
   laminating the upper cushion body and the lower cushion body to obtain a semi-finished product; and
   shaping to obtain a finished product.

2. The process according to claim 1, after the upper cushion body and the lower cushion body are laminated, further comprising fulling the airbag with air or liquid.

3. The process according to claim 2, wherein in preparing materials further comprises: preparing the upper cushion surface and the lower cushion surface, smearing the upper surface of the lower cushion surface uniformly with a hot-melt adhesive, and then spreading the upper cushion surface to the upper surface of the lower cushion surface in an alignment manner, wherein regular concave-convex grains are arranged on the surface of the upper cushion surface close to the lower cushion surface to bond with the lower cushion surface, wherein the lower cushion surface has certain elasticity to be stretched to four sides of the material of the lower cushion surface to generate a balanced force, so as to protect the material I and the upper cushion body formed, and enable it to be well combined with the lower cushion body to maintain the stability of the manufactured airbag cushion, wherein a material of the lower cushion surface is either TPU elastomer rubber or EVA.

4. The process according to claim 3, wherein in laminating further comprises: placing the prepared material on a laminating machine for laminating and molding, the laminating machine being provided with a front roller, a rear pressure roller and a winding roller, wherein a temperature of the front roller is between 60° C. and 120° C., and a temperature of the rear pressure roller is room temperature or 90° C.

5. The process according to claim 4, wherein in preparing the upper cushion body further comprises:
   air cooling the material I which has been laminated and molded for more than 24 hours for cooling and shrinkage;
   preparing a movable first jig, fixing the material I molded to the first jig, putting the material I into an oven heated to a temperature in a range from 180° C. to 220° C. and baking the material I for 60-120 seconds;
   preparing a first male mold and a first female mold, placing and fixing the first male mold and the first female mold on an oil hydraulic press, and sheathing and engaging the first jig on which the material I is baked around a mold frame of the first female mold;

preparing a second jig which area is larger than an area of the first female mold and preparing a material II corresponding to the area of the second jig, fixing the material II with the second jig with a clip, then wetting the material II and covering the material I with the wetted material II;

placing the second jig fixed with the material II on the upper surface of the first jig, and completely covering the first jig with the material II; and die-casting to obtain the upper cushion body comprising a plurality of airbags and a plurality of air channels, the plurality of air channels correspondingly connecting the plurality of airbags to an exterior environment.

6. The process according to claim 5, wherein in laminating the upper cushion body and the lower cushion body further comprises:

preparing a second female mold, fixing the second female mold on a high-frequency machine, and placing the upper cushion body on the second female mold while the airbags are placed downward, correspond to recessed holes of the second female mold one to one;

preparing the lower cushion body and an insulating fabric, covering the upper cushion body with the lower cushion body in an alignment manner, and then covering the lower cushion body with the insulating fabric in an alignment manner; the materials of the lower cushion body and the lower cushion surface being the same;

preparing a second male mold, fixing the second male mold on the high-frequency machine, operating the high-frequency machine to laminate the upper cushion body and the lower cushion body by electric waves; during the lamination, pumping air with an air filling device through reserved air inlets, and compressing the air inlets and air intercepting ports of each group of air chambers by using the high-frequency machine to obtain the airbag cushion.

7. An anti-gravity balance massage type buffer convection airbag cushion comprising a plurality of airbags, and convection units formed among the plurality of airbags, each of the convection units comprising more than two of the plurality of airbags, and adjacent airbags in the convection units being connected by air channels, such that air or liquid flows among the plurality of airbags.

8. The anti-gravity balance massage type buffer convection airbag cushion according to claim 7, wherein the airbag cushion further comprises airbag units, each of the airbag units comprising single and independent airbag, gaskets or pads being disposed in the airbags of the airbag units, and the gaskets or pads being configured to support a human body.

9. The anti-gravity balance massage type buffer convection airbag cushion according to claim 8, wherein the gaskets or pads are made of a flexible material to provide buffering and support; and the surfaces of the plurality of airbags comprise at least one non-slip protrusion configured to stop the airbag from slipping.

10. An airbag cushion comprising an upper cushion body and a lower cushion body, wherein the upper cushion body comprises an upper cushion surface and a lower cushion surface adhered together by adhesive, the upper cushion surface and the lower cushion surface are made of different materials, and a material of the lower cushion surface is higher in elasticity than a material of the upper cushion surface, grains are formed on a surface of one side of the lower cushion surface away from the upper cushion surface, the surface of a side of the lower cushion surface is bonded and fixed with the lower cushion body, so that a bonding area and an unbonding area are formed between the lower cushion surface and the lower cushion body, wherein a plurality of air bags are formed in the unbonding area, and a plurality of air channels connecting the plurality of air bags are correspondingly formed in the bonding area.

11. The airbag cushion according to claim 10, further comprising regular concave-convex grains arranged on the surface of the upper cushion surface close to the lower cushion surface to bond with the lower cushion surface.

12. The airbag cushion according to claim 11, wherein the upper cushion body is obtained by:

heating a material I obtained by laminating the upper cushion surface and the lower cushion surface, and then covering the lower cushion surface of the material I, wherein a material II is an elastic fabric and is stretched to completely cover the material I; and after die-casting molding, removing the material II from the lower cushion surface to obtain the upper cushion body, wherein the grains on the lower cushion surface corresponds to grains on the material II.

13. The airbag, cushion according to claim 10, wherein the material of the lower cushion surface is either TPU elastomer rubber or EVA.

* * * * *

UNITED STATES PATENT AND TRADEMARK OFFICE
CERTIFICATE OF CORRECTION

PATENT NO. : 11,639,041 B2
APPLICATION NO. : 16/809538
DATED : May 2, 2023
INVENTOR(S) : Peilin Cai It is certified that error appears in the above-identified patent and that said Letters Patent is hereby corrected as shown below:

On the Title Page

Item (72) should read:
(72) Inventor: PEI-LIN TSAI, Guangdong (CN)

Signed and Sealed this
Fourth Day of July, 2023

Katherine Kelly Vidal
*Director of the United States Patent and Trademark Office*